United States Patent [19]

Tsumura et al.

[11] Patent Number: 4,570,062

[45] Date of Patent: Feb. 11, 1986

[54] SYSTEM FOR OPTICALLY TRANSFERRING INFORMATION BETWEEN A MOVING OBJECT AND A FIXED POSITION

[75] Inventors: Toshihiro Tsumura, Osaka; Shigeki Kamei, Nishinomiya; Akira Takahashi, Saitama, all of Japan

[73] Assignees: Hitachi Kidenkogyo Kabushiki Kaisha, Amagasaki; Yagiantena Kabushiki Kaisha, Tokyo, both of Japan

[21] Appl. No.: 490,419

[22] Filed: May 2, 1983

[30] Foreign Application Priority Data

May 1, 1982 [JP] Japan ............................ 57-74290

[51] Int. Cl.[4] .................................................. G02F 1/01
[52] U.S. Cl. ........................................ 250/225; 455/605
[58] Field of Search .......................... 180/167, 168, 169; 250/225, 234, 235, 236, 203 R; 455/616, 604, 605, 606, 609, 617

[56] References Cited

U.S. PATENT DOCUMENTS

| | | | |
|---|---|---|---|
| 3,989,942 | 11/1976 | Waddoups | 250/203 R |
| 4,064,434 | 12/1977 | Waksberg | 455/605 |
| 4,096,380 | 6/1978 | Eichweber | 455/605 |
| 4,131,791 | 12/1978 | Lego | 455/605 |
| 4,134,008 | 1/1979 | De Corlieu | 250/203 R |
| 4,361,911 | 11/1982 | Buser et al. | 455/604 |
| 4,398,172 | 8/1983 | Carroll et al. | 455/604 |

*Primary Examiner*—David C. Nelms
*Attorney, Agent, or Firm*—Armstrong, Nikaido, Marmelstein & Kubovcik

[57] ABSTRACT

An information transfer system for transferring information to a fixed position from a moving object. The information system includes a light beam scanning along the route of the moving object. The light beam is linearly deflected. The moving object is provided with a modulation-reflection apparatus which receives the linearly-deflected light and changes a rotary angle at a polarization surface based upon information from the moving object itself such as object number, destination, or running speed. This modulates the incident light and reflects it back in the direction from which it came. The reflected light from the modulation-reflection apparatus is received through a light-sensitive detection device which allows the light to pass corresponding to the rotary angle of the polarization surface. Consequently, information regarding the moving object is discriminated.

5 Claims, 9 Drawing Figures

4,570,062

SYSTEM FOR OPTICALLY TRANSFERRING INFORMATION BETWEEN A MOVING OBJECT AND A FIXED POSITION

BACKGROUND OF THE INVENTION (1) Field of the Invention

This invention relates to an information transfer system for a moving object, which transfers the information between a predetermined spot and a moving object traveling on a route.

(2) Description of the Prior Art

A system has hitherto been well-known which provides a receiving station in the vicinity of an intersection and transfers information regarding a car from a transmitter provided thereat to the receiving station by use of radio waves so that the receiving station receives the radio waves to discriminate the present location of the car. Recently, optical communication has been put to practical use positively in various fields. Optical communication, when it is possible to use such to transfer the information to a fixed position from the moving object, such as the car, is very convenient, so that the present invention has proposed an information transfer system usable for the above described purpose.

SUMMARY OF THE INVENTION

An object of the invention is to provide an information transfer system for a moving object, which is relatively simple in construction and capable of optically transferring the information between the predetermined spot and the moving object traveling on the route.

Accordingly, the present invention is characterized in that a light beam scans along the route from the predetermined spot and is linearly-deflected; the moving object is provided with a modulation-reflection means which receives the linearly-deflected light beam and changes the rotary angle of its plane of polarization on the basis of information regarding the moving object, thereby modulating the incident light beam and reflecting it in the direction of the incident light beam; and the reflected light beam from the modulation and reflection means is received through a light-sensitive detection means which selectively allows the light beam to pass therethrough depending upon the rotary angle of its polarization plane, so that the information regarding the moving object is discriminated on the basis of the above described modulation and demodulation technique.

These and other objects of the invention will be seen by reference to the description taken in conjunction with the accompanying drawings.

BRIEF DESCRIPTION OF THE DRAWINGS

FIG. 2 is a structural view exemplary of a laser-beam generating apparatus 3, in which

DESCRIPTION OF THE PREFERRED EMBODIMENTS

Figure 1:
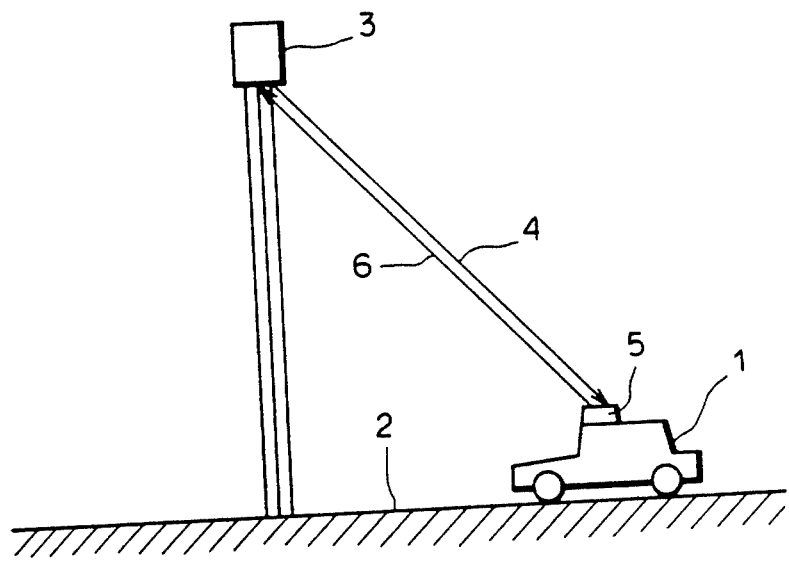
FIG. 1 is a view explanatory of the principle of the invention.

Referring to FIG. 1, a moving object 1, e.g., a car, runs on a road 2 of the route for the car 1, and a laser beam generating apparatus 3 is provided at a predetermined spot and at a predetermined height thereabove and allows a laser beam 4 having a sharp directivity to scan along the road 2. On the car 1 is provided a modulation-reflection means 5 which modulates the laser beam 4 in accordance with information regarding the car 1, the information including the car number, the destination or the running speed. A laser beam 6 is modulated with this information so as to be reflected toward the laser beam generating apparatus 3, which receives the modulated light beam 6 and discriminates the information as to the car 1.

The laser beam generating apparatus 3 of an embodiment of an information transfer system of the invention includes a laser beam scanning means for scanning the laser beam 6 along the road 2, a polarization means for plane-polarizing the laser beam 6, a light-sensitive-detection means selectively allowing the light beam to pass therethrough depending upon a rotary angle of the plane of polarization of the laser beam 6 returning from the car 1, a receiving means for receiving the laser beam having passed through the light-sensitive-detection means, and a discrimination means for discriminating a signal from the receiving means.

Figure 2A:
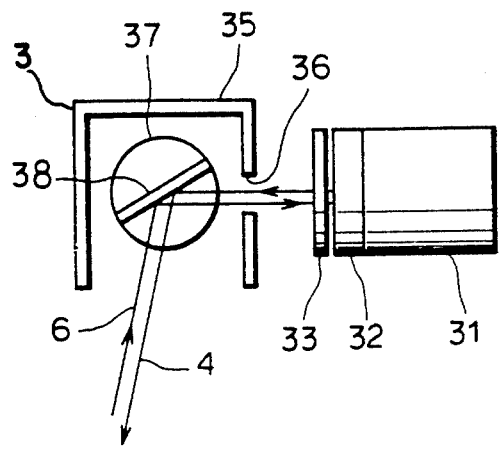
FIG. 2(a) is a front view of the laser beam generating apparatus 3.
Figure 2B:
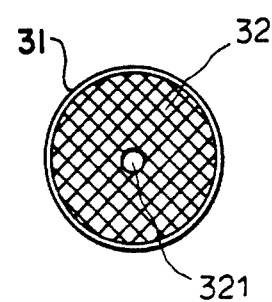
FIG. 2(b) is a side view of laser beam generator 31.
Figure 2C:
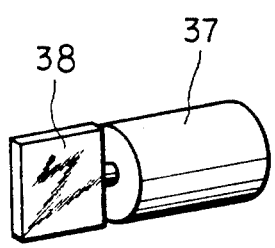
FIG. 2(c) is a perspective view of a rotary mirror 38 mounted to a motor 37.

In FIG. 2(a), reference numeral 31 designates a laser beam generator. A solar cell 32, utilized as the receiving means, as shown in FIG. 2(b), is provided at the front of laser beam generator 31, at the center of which is bored a bore 321 through which the laser beam 4 passes.

In addition, the receiving means utilized is not confined to the solar cell, but may use a photodiode or a photo-transistor.

Figure 2D:
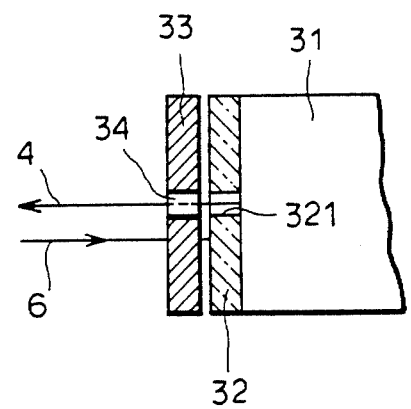
FIG. 2(d) is a view explanatory of a laser beam in a condition of being projected from and incident on the laser beam generator 31.

The solar cell 32, as shown in FIG. 2(d), is provided at the front thereof with an analyzer 33 and at the position opposite to the bore 321 with a polarizer 34 as a polarizing means.

On the other hand, a housing 35 shown in FIG. 2(a), has a bore 36, through which the laser beam 4 generated from the laser beam generator 31 passes, and accommodates a rotary mirror 38 mounted to a drive shaft of an electric motor 37 which rotates the mirror 38 to reflect the laser beam 4 generated from the laser beam generator 31, the laser beam 4 scanning sequentially along the road 2. Thus, the laser beam scanning means includes the laser beam generating means 31 and rotary mirror 38 rotated by the motor 37.

Figure 3A:
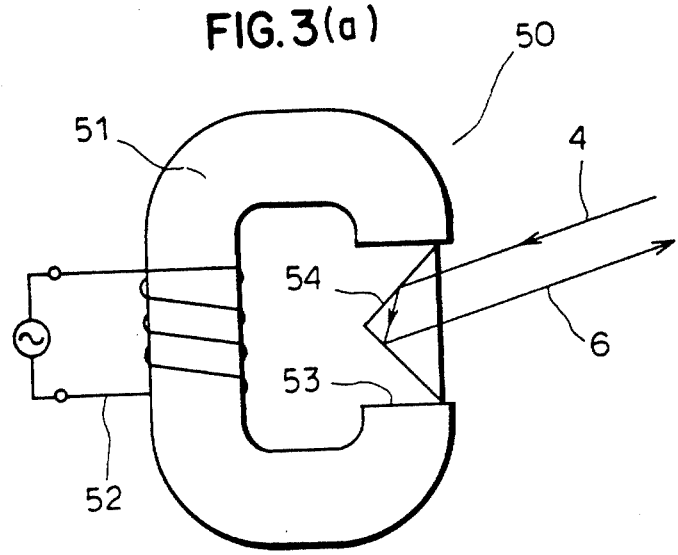
FIG. 3(a) is a view explanatory of a modulator-reflector 50 included in a modulation-reflection means 5 located on a car 1.
Figure 3B:
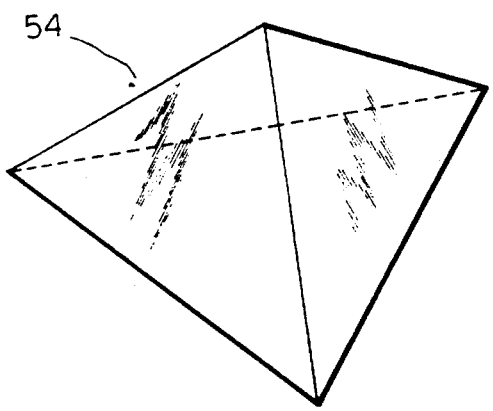
FIG. 3(b) is a perspective view of a corner cube.

Referring to FIG. 3(a), reference numeral 51 designates an C-like-shaped iron core around which a coil 52 is wound. In a gap 53 of the core 51 is interposed a corner cube 54 formed of a Faraday effect element of lead glass and shaped as shown in FIG. 3(b). Hence, the laser beam 4 incident on the corner cube 54 is reflected thereby in the direction of the incident laser beam 4. While the incident laser beam 4 is being so reflected, the coil 52 would around the core 51 is supplied at both ends thereof with an information signal regarding the car 1 as, for example a pulse signal comprising a predetermined code. As a result, a current flowing in the coil 52 changes in correspondence with the pulse signal and subsequently a magnetic field generated in the coil 52 changes, whereby the plane of polarization of the laser beam 4 incident on the corner cube 44 and plane-polarized therewith will be rotated by the Faraday effect thereon in correspondence with the pulse signal supplied to the coil 52. Hence, the laser beam 6 reflected from the corner cube 54 is polarization-modulated by the information signal regarding the car 1.

Figure 4:
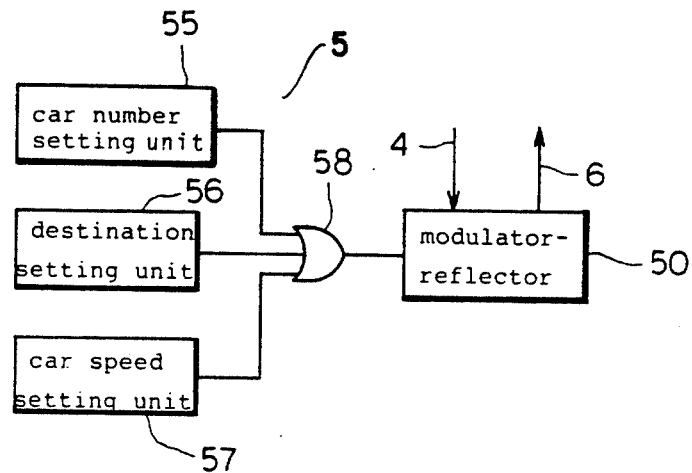
FIG. 4 is a block diagram of the modulation-reflection means 5.

In detail, the modulator-reflector 50, as shown in FIG. 4, is supplied, for example, with signals representing the car number, the destination information, and the speed information of the car 1, the car number signal being set by a car number setting unit 55, the destination information signal by a destination setting unit 56, and the car speed signal by a car-speed detector 57. Pulse signals representing the information from the car number setting unit 55, destination setting unit 56 and car speed setting unit 57, are applied to the modulator-reflector 50 through an OR gate 58, the modulator-reflector 50 modulating the laser beam 4 incident thereon on the basis of the information signals applied from the OR gate 58.

Figure 5:
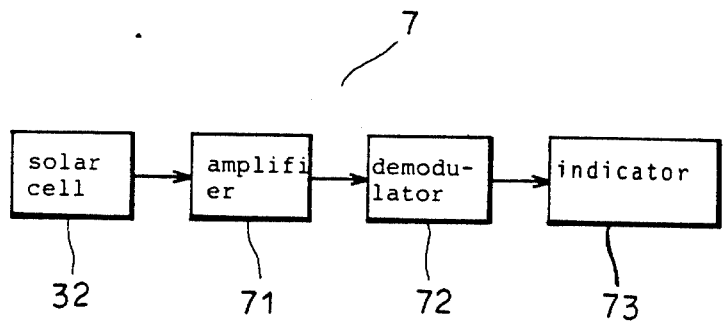
FIG. 5 is a schematic block diagram of a receiving apparatus 7 provided in connection with the laser beam generating apparatus 3.

Next, referring to FIG. 5, the solar cell 32 utilized as the receiving means detects the laser beam 6 having passed through the analyzer 33 so that a signal detected by the solar cell 32 is amplified by an amplifier 71 and applied to a demodulator 72, the demodulator 72 serving to demodulate the information signal of laser beam 6 and to discriminate the information regarding the car 1, the signal demodulated by the demodulator 72 being applied to, for example, an indicator 73 which displays the car number, destination or car speed of car 1.

Next, explanation will be given on a concrete operation of an embodiment of the information transfer system of the invention by reference to FIGS. 1 through 5. Firstly, the laser beam 4 generated by the laser beam generator 31 passes through the polarizer 34 and is plane-polarized to be incident on the rotary mirror 38 and is then sequentially scanned thereby along the road 2 on which the car 1 runs. As a result, the modulator-reflector 50 loaded on the car 1 receive the laser beam 4 at a certain spot on the road 2. While receiving the incident beam 4, the modulator-reflector 50 at the modulation-reflection means 5 is supplied information signals from any one of the car number setting unit 55, destination setting unit 56 and car speed setting unit 57, such as the pulse signal, through the OR gate 58. Therefore, the laser beam 4 incident on the corner cube 54 of the modulator-reflector 50 undergoes rotation of its polarization plane in correspondence with the applied pulse signal by means of the Faraday effect and is subjected to modulation, the laser beam 6 modulated in the corner cube 54 being reflected in the incident direction of laser beam 4 and then reflected by the rotary mirror 38 to be incident on the analyzer 33. Since the analyzer 33 allows only the incident light having a polarization plane of a predetermined angle to pass therethrough, when the analyzer 33 is set to pass therethrough only the light whose polarization plane is rotated due to modulation applied by the modulator-reflector 50, the laser beam passing through the analyzer 33 becomes an interrupted light beam corresponding to the pulse signal. Accordingly, the solar cell 32, receiving the laser beam 6 having passed through the analyzer 33, outputs a signal corresponding to the pulse signal representing the information regarding the car 1, the signal being amplified by the amplifier 71 included in a receiving unit 7, and thereafter demodulated and discriminated into the predetermined pulse signal by the demodulator 72 as the discrimination means, and thereby being applied to the indicator 73. As a result, the indicator 73 displays the car number, destination, or car speed, of car 1.

Alternatively, the laser beam for scanning may be a light beam of infrared rays, visible rays or others.

As can be seen from the above description, the information transfer system for the moving object of the invention can transfer the information by light between the predetermined spot and the moving object on the road without providing the light-beam generating means at the moving object, thereby being very convenient for practical use.

While an embodiment of the invention has been shown and described, the invention is not limited to the specific construction thereof, which is merely exemplary in the specification rather than confined thereto.

What is claimed is:

1. A system for optically transferring information between a moving object traveling along a route of travel and a predetermined spot, comprising:
   light beam-scanning means provided above the predetermined spot for sequentially scanning a light beam along the route of travel;
   polarization means provided at the light-beam scanning means for plane-polarizing the light beam being scanned along the route of travel;
   modulation-reflection means provided on an object movable along the route of travel, for receiving the plane-polarized light beam scanned along the route of travel incident thereon and reflecting the received light beam back along its direction of incidence, the modulation-reflection means impressing a modulation signal on the reflected light beam in accordance with information regarding the status of the moving object, the modulation signal corresponding to a predetermined angular rotation of the plane of polarization of the reflected light beam with respect to the plane of polarization of the received light beam;
   light-analyzing means at the light-beam scanning means for receiving the light beam reflected from the modulation-reflection means, the light-analyzing means selectively passing therethrough only light beams having a predetermined plane of polarization corresponding to the modulation signal;
   light-receiving means provided in operable association with the the light-analyzing means for receiving light beams passing through the light-analyzing means and providing an output signal corresponding thereto; and
   discriminating means in operable association with the light-receiving means for discriminating said information regarding the status of the moving object on the basis of the output signal from the light receiving means.

2. A system for optically transferring information in accordance with claim 1, wherein the light beam-scanning means comprises:
   laser beam generator means for generating a laser beam along an axis;

rotary mirror means disposed in the axis of the generated laser beam for angularly deflecting the laser beam along the route of travel as an incident beam, and for angularly deflecting a reflected light beam from the modulation-reflection means of the object along the axis of the generated laser beam; and means for rotating the rotary mirror means for sequentially scanning the laser beam angularly deflected thereby along the route of travel.

3. A system for optically transferring information in accordance with claim 2, wherein the light-analyzing means is disposed surrounding the axis of the generated laser beam, the light analyzing means having a bore therethrough on said axis through which the generated laser beam may pass, and wherein the polarization means is disposed in said bore through the light-analyzing means and in said axis.

4. A system for optically transferring information in accordance with claim 3, wherein the light-receiving means is disposed between the light-analyzing means and the laser beam generator means, the light receiving means having a bore therethrough on said axis through which the generated laser beam may pass.

5. A system for optically transferring information in accordance with claim 1, wherein the modulation-reflection means comprises:

a C-shaped iron core having a gap;

a coil wound around a leg of the core; and a corner cube reflector formed of a Faraday-effect element and disposed in the gap of the core;

whereby changes in a current flowing in the coil cause corresponding changes in a magnetic field generated in the coil such that corresponding modulating rotation of the plane of polarization of said incident light beam reflected by the corner cube is produced in accordance with changes in said current.

* * * * *